United States Patent Office 3,600,199
Patented Aug. 17, 1971

3,600,199
METHOD OF PRESERVING POTATOES AND OTHER ROOT VEGETABLES BY FREEZING AND COLD STORAGE
Frederik Otto Ornbaek, 27 Nokkedalen,
2730 Herlev, Denmark
No Drawing. Filed Dec. 19, 1968, Ser. No. 785,333
Int. Cl. A23b 7/00, 1/06
U.S. Cl. 99—193                                    1 Claim

ABSTRACT OF THE DISCLOSURE

The invention relates to a method of preserving potatoes by freezing in such manner that the taste and other qualities of the potato is unimpaired.

---

The present invention relates to a method of preserving potatoes and other root vegetables such as beets, carrots, celery and beet roots.

It is well known that root vegetables as those mentioned and, in particular, potatoes, cannot be preserved by freezing, because the velocities of the chemical reactions in the potato or root vegetable are disturbed at low temperatures, resulting in the formation of carbohydrates of an essentially sweet taste so that the taste of the fresh vegetable cannot be preserved. Potatoes and other vegetables are therefore stored at places that are frost-proof, for example in clamps out-of-doors or in cellars.

However, it involves a considerable loss to store potatoes and root vegetables under the said conditions, partly owing to direct decay, partly by loss of weight, without the potatoes or the root vegetables becoming inedible for that reason.

There is consequently a great need for preserving potatoes and root vegetables in such manner that their chemical composition and consequently their taste remain unaltered, and so that the very great nutritional value is not lost.

By the invention it has now been found that potatoes and other root vegetables contrary to the belief so far may be preserved by freezing without deterioration of their taste.

An essential feature of the method according to the invention is that the potatoes or the root vegetables, shortly after being lifted, are relieved of earth and impurities, frozen down to a temperature in the range of −20° C. to −32° C. and kept at this temperature for at least 48 hours, and finally stored at a temperature not exceeding −8° C. until they are to be consumed.

By this method potatoes preserve a fresh, non-preserved taste, and in the case of certain other root vegetables, these undergo, if anything, rather an improvement in taste, turnips having, for example, after preservation by the method according to the invention a slightly less bitter taste than fresh turnips, by which a number of root crops otherwise used essentially as feeding stuff for cattle become more appealing to the human taste. The method according to the invention has the additional advantage that potatoes after preservation will sooner obtain the desired degree of tenderness by boiling than potatoes stored in conventional manner in a clamp or in a dry and frost-proof cellar.

EXAMPLE 1

Potatoes of the sort "Mausel" are lifted from a plot on June 28. A number of the potatoes are carefully rinsed in water and frozen down to −25° C. and kept at this temperature for 2 days. The temperature at which the potatoes are stored is then allowed to rise to −15° C. The rest of the potatoes are stored in usual manner in a cold cellar at about 8° C. On November 15 a comparative taste grading of the two quantities of potatoes is made, potatoes from each quantity being put into cold water and boiled. The boiling time for the potatoes that are kept in conventional manner is 24 minutes and the boiling time for the potatoes preserved by the method according to the invention is 12 minutes. A panel of tasters cannot ascertain any difference between the two quantities of potatoes.

EXAMPLE 2

Potatoes of the sort "Mausel" are lifted from a plot on September 20. A number of the potatoes are carefully rinsed in water and frozen down to −30° C. and kept at this temperature for 2 days. The temperature at which the potatoes are stored is then allowed to rise to −12° C. The rest of the potatoes are stored in usual manner by clamping in the field. On April 1 of the following year, about 6 months after the potatoes having been lifted, there is a loss of about 30% of the clamped potatoes, but no loss of potatoes frozen down. At this time a comparative taste grading of the two quantities of potatoes is made in the same way as in Example 1. The potatoes preserved by the method according to the invention are found to have a better (fresher) taste than the potatoes preserved by clamping.

EXAMPLE 3

Turnips of the sort "Bankholmer" are lifted from a field on October 10, and a number of the turnips are carefully rinsed in water and frozen down to −25° C. for 2 days and then stored until May 10 of the following year at a temperature of −10° C., whereas the rest of the turnips are clamped. On May 10 the loss of the clamped turnips is found to be 15%. The two quantities of turnips are subjected to comparison by teste, the turnips being cut partly into cubes intended to be stewed, partly cut into round sticks used instead of asparagus in tartlets (pastry shells). The clamped turnips are found to have a stale taste, whereas the frozen turnips have a fresh taste, and where served in tarlets they were, in fact, presumed to be asparagus.

I claim:
1. A method of preserving potatoes and other root vegetables, characterized in that the potatoes or other root vegetables, shortly after being lifted, are relieved of earth and impurities, frozen down to a temperature in the range of −20° C. to −32° C. and kept at this temperature for at least 48 hours, and finally stored at a temperature not exceeding −8° C. until they are to be consumed.

References Cited

UNITED STATES PATENTS

| | | | |
|---|---|---|---|
| 2,597,065 | 5/1952 | Chase | 99—193 |
| 2,597,067 | 5/1952 | Chase | 99—193 |
| 2,950,203 | 8/1960 | Groen et al. | 99—193X |
| 3,009,814 | 11/1961 | Rivoche | 99—192 |
| 3,136,642 | 6/1964 | Backinger et al. | 99—193 |
| 3,250,630 | 5/1966 | Webster et al. | 99—193 |
| 2,942,428 | 6/1960 | Morrison | 62—60 |

OTHER REFERENCES

"Quick Frozen Foods," June 1961, pp. 46–49, Procurement and Processing of Frozen Potatoes by R. R. Bohannon.

NORMAN YUDKOFF, Primary Examiner

F. E. DRUMMOND, Assistant Examiner

U.S. Cl. X.R.

99—100